US012578910B2

(12) United States Patent
Mitsumori et al.

(10) Patent No.: US 12,578,910 B2
(45) Date of Patent: Mar. 17, 2026

(54) INFORMATION PROCESSING DEVICE, INFORMATION PROCESSING METHOD, AND RECORDING MEDIUM

(71) Applicant: Sony Group Corporation, Tokyo (JP)

(72) Inventors: Haruka Mitsumori, Kanagawa (JP); Noriaki Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/846,092

(22) PCT Filed: Mar. 13, 2023

(86) PCT No.: PCT/JP2023/009500
§ 371 (c)(1),
(2) Date: Sep. 11, 2024

(87) PCT Pub. No.: WO2023/189456
PCT Pub. Date: Oct. 5, 2023

(65) Prior Publication Data
US 2025/0190159 A1 Jun. 12, 2025

(30) Foreign Application Priority Data
Mar. 29, 2022 (JP) ................................. 2022-053272

(51) Int. Cl.
*G06F 3/14* (2006.01)
*G06T 5/80* (2024.01)
(Continued)

(52) U.S. Cl.
CPC .................. *G06F 3/14* (2013.01); *G06T 5/80* (2024.01); *G06T 7/80* (2017.01); *G09G 5/10* (2013.01);
(Continued)

(58) Field of Classification Search
CPC .... G06F 3/14; G06T 5/80; G06T 7/80; G09G 5/10; G09G 5/38; G09G 5/00;
(Continued)

(56) References Cited

U.S. PATENT DOCUMENTS 11,412,156 B1 * 8/2022 Marks ...................... H04N 5/92
2011/0216184 A1 * 9/2011 Sakagami ................ H04N 7/18
348/79

(Continued)

FOREIGN PATENT DOCUMENTS

CN 113556443 A * 10/2021
JP 2011-259047 A 12/2011
WO WO 2021/119272 A1 6/2021

*Primary Examiner* — Brent D Castiaux
(74) *Attorney, Agent, or Firm* — Paratus Law Group, PLLC

(57) ABSTRACT
There is provided an information processing device, an information processing method, and a recording medium that enable high quality images to be displayed on a display. The information processing device includes a display control unit that reflects a correction corresponding to a post-process for a shot image shot by a camera for shooting a display to display of a display image on the display based on at least one of a position of the camera, an attitude of the camera, and a shooting condition. The present technology can be applied, for example, to a shooting system used in virtual production, in which a subject is shot with an image displayed on an LED display as a background.

20 Claims, 19 Drawing Sheets

(51) Int. Cl.

| | |
|---|---|
| *G06T 7/80* | (2017.01) |
| *G09G 5/10* | (2006.01) |
| *G09G 5/38* | (2006.01) |
| *H04N 9/73* | (2023.01) |

(52) U.S. Cl.

CPC ................. *G09G 5/38* (2013.01); *H04N 9/73* (2013.01); *G09G 2320/0626* (2013.01); *G09G 2320/0666* (2013.01)

(58) Field of Classification Search

CPC ... G09G 2320/0626; G09G 2320/0666; H04N 9/73; H04N 5/22; H04N 23/60

See application file for complete search history.

(56) References Cited

U.S. PATENT DOCUMENTS

| | | | | |
|---|---|---|---|---|
| 2014/0232880 A1* | 8/2014 | Murase | ................. | H04N 17/02 |
| | | | | 348/189 |
| 2021/0065395 A1* | 3/2021 | Wiley | ............. | G06K 19/06037 |
| 2021/0183138 A1 | 6/2021 | Sauermann et al. | | |

* cited by examiner

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2023/009500 (filed on Mar. 13, 2023) under 35 U.S.C. § 371, which claims priority to Japanese Patent Application No. 2022-053272 (filed on Mar. 29, 2022), which are all hereby incorporated by reference in their entirety.

TECHNICAL FIELD

The present technology relates to an information processing device, an information processing method, and a recording medium, and more particularly to an information processing device, an information processing method, and a recording medium that enable high quality images to be displayed on a display.

BACKGROUND ART

Recently, virtual production (In-Camera VFX), which is a shooting technique that uses a large light emitting diode (LED) display, has become popular in shooting for movies and TV dramas.

In virtual production, an image displayed on an LED display is used as the background, and a subject placed in front of the LED display is used as the foreground. Also in virtual production, the background image is rendered based on the camera position, camera attitude, and lens profile (e.g., see PTL 1).

CITATION LIST

Patent Literature

PTL 1:
    U.S. Patent Application Publication No. 2021/0183138
    (Specification)

SUMMARY

Technical Problem

When an image to be displayed on an LED display is shot by a camera, the final shot image contains, for example, degradation due to lens aberration and degradation due to the characteristics of the LED display. If the degradation caused by lens aberration is corrected using conventional functions that have been built into the camera, the image quality of the shot image will be degraded, such as with increased noise and a narrower angle of view. It is also difficult for the camera to optimally correct the degradation caused by the characteristics of the LED display during shooting.

The present technology has been made in view of such a situation, and makes it possible to improve the image quality of images to be displayed on a display.

Solution to Problem

An information processing device according to one aspect of the present technology includes a display control unit that reflects a correction corresponding to a post-process for a shot image shot by a camera for shooting a display to display of a display image on the display based on at least one of a position of the camera, an attitude of the camera, and a shooting condition.

An information processing method according to one aspect of the present technology includes, by an information processing device, reflecting a correction corresponding to a post-process for a shot image shot by a camera for shooting a display to display of a display image on the display based on at least one of a position of the camera, an attitude of the camera, and a shooting condition.

A recording medium according to one aspect of the present technology records a program for executing processing of reflecting a correction corresponding to a post-process for a shot image shot by a camera for shooting a display to display of a display image on the display based on at least one of a position of the camera, an attitude of the camera, and a shooting condition.

In one aspect of the present technology, a correction corresponding to a post-process for a shot image shot by a camera for shooting a display is reflected to display of a display image on the display based on at least one of a position of the camera, an attitude of the camera, and a shooting condition.

DESCRIPTION OF EMBODIMENTS

An embodiment for implementing the present technique will be described below.

The description will be made in the following order.
1. Overview of Shooting System
2. Configuration and Operation of Shooting System
3. How to Correct Each Type of Deterioration <1. Overview of Shooting System>

Figure 1:
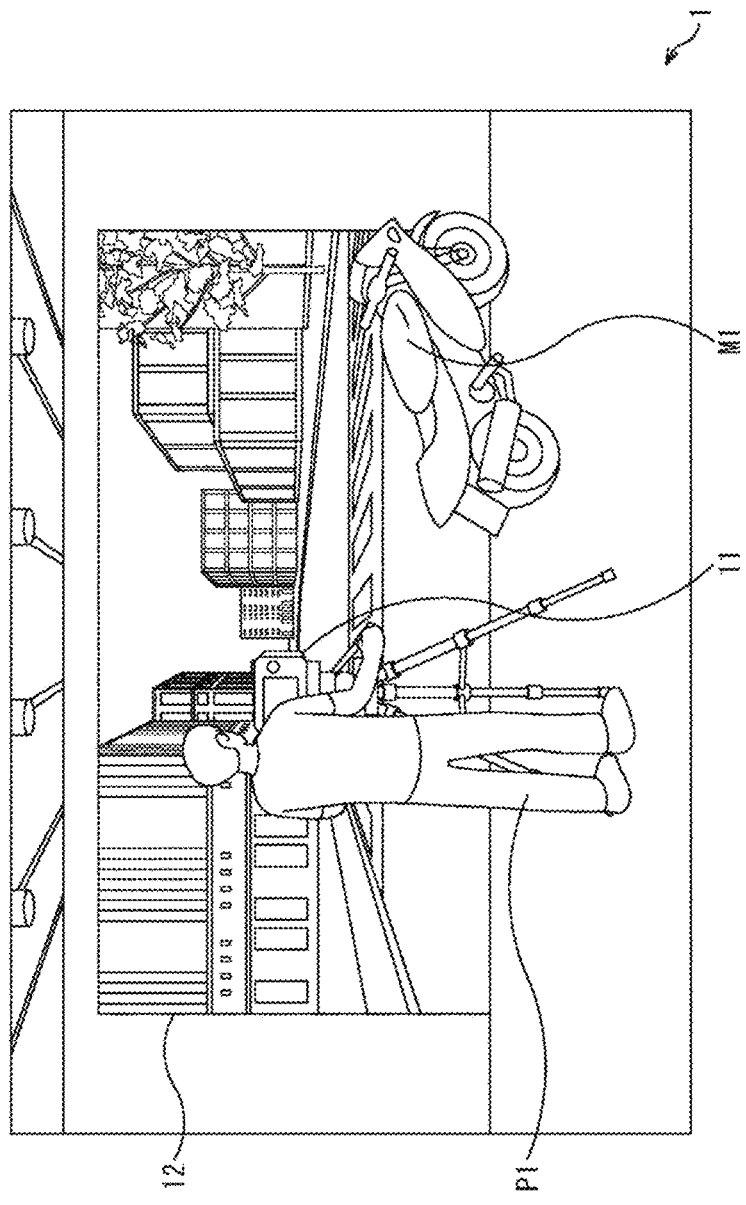
FIG. 1 is a diagram illustrating an overview of a shooting system to which the present technology is applied.

FIG. 1 is a diagram illustrating an overview of a shooting system 1 to which the present technology is applied.

The shooting system 1 of FIG. 1 is a system used for, for example, shooting in virtual production (In-Camera VFX). The shooting system 1 includes a video camera 11, a wall-type light emitting diode (LED) display 12, and an information processing device (not illustrated) that controls the LED display 12.

The LED display 12 is placed in a studio, for example. The LED display 12 displays, as a display image, for example, an image of a virtual space created by computer graphics (CG). A photographer P1 uses the video camera 11 to shoot a motorcycle M1, which is a subject, with the display image displayed on the LED display 12 as the background.

Figure 2:
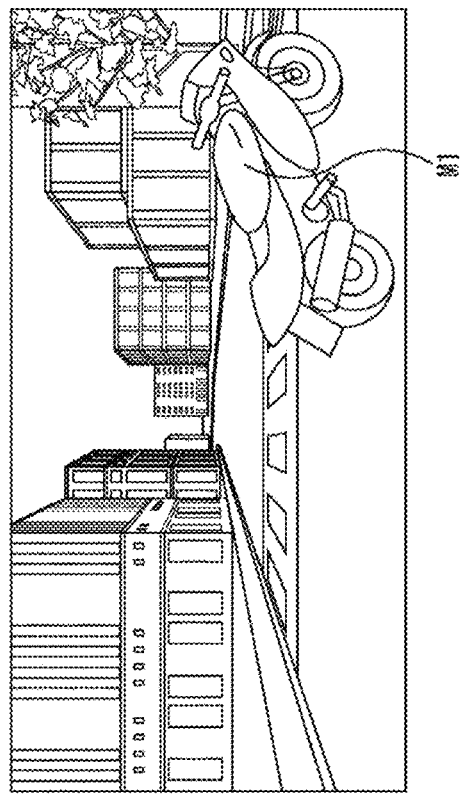
FIG. 2 illustrates an example of a shot image shot by a video camera.

FIG. 2 illustrates an example of a shot image shot by the video camera 11.

As illustrated in FIG. 2, a captured image shot by the video camera 11 is an image in which the motorcycle M1 appears as if it were present in the virtual space appearing in the display image. In this way, by using the shooting system 1, the photographer P1 can shoot in a studio a shot image in which the space appearing in the display image appears to be expanding in the background of the motorcycle M1.

Figure 3:
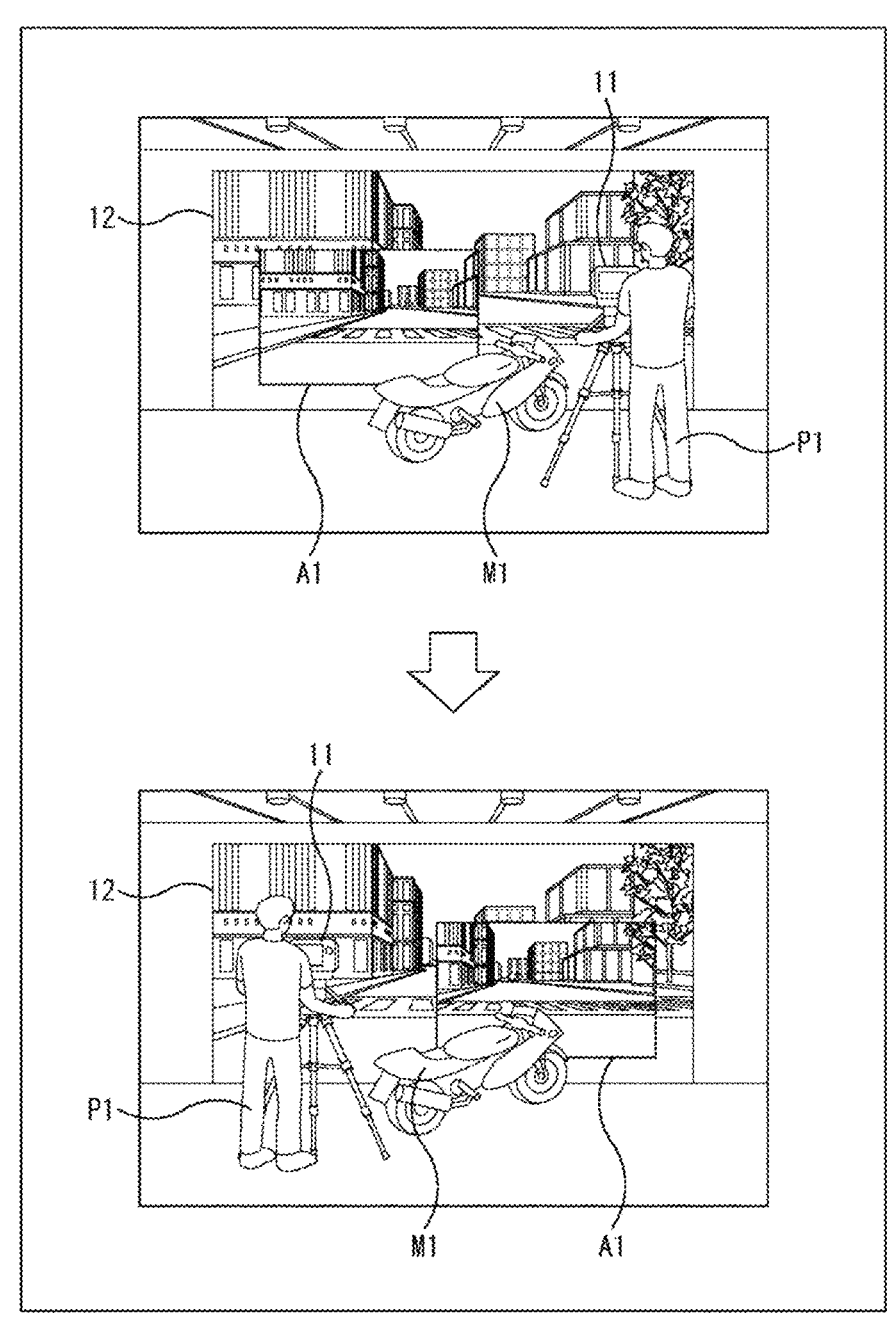
FIG. 3 illustrates an example of how an image is shot.

FIG. 3 illustrates an example of how an image is shot.

As illustrated in FIG. 3, during shooting, for example, the entire display image is displayed on the entire LED display 12.

As illustrated on the upper side of FIG. 3, when the video camera 11 is shooting from the right side facing the motorcycle M1 located in the center, a portion of the display image is displayed in a shooting area A1, which is an area on the LED display 12 included in the shooting range of the video camera 11, so that it is superimposed on the entire display image. In the shooting area A1, for example, an image of a portion that is the background when shooting from the right side facing the motorcycle M1 in the virtual space appearing in the display image is cut out from the entire display image and displayed.

As illustrated on the lower side of FIG. 3, when the video camera 11 is shooting from the left side facing the motorcycle M1 located in the center, a portion of the display image is displayed in the shooting area A1 so that it is superimposed on the entire display image. In the shooting area A1, for example, an image of a portion that is the background when shooting from the left side facing the motorcycle M1 in the virtual space appearing in the display image is cut out from the entire display image and displayed.

In this way, during shooting, the information processing device tracks the camera work (position and attitude) of the video camera 11 and controls the position of the display image displayed on the LED display 12 in accordance with the camera work of the video camera 11. Specifically, the information processing device detects the shooting area based on the position, attitude, and settings of the video camera 11, and controls the display image to be displayed in the shooting area.

In FIG. 3, for ease of understanding, the shooting area A1 is illustrated surrounded by a thick line, but in reality, no line surrounding the shooting area is displayed.

In virtual production, a display image displayed on the LED display 12 is shot by a camera, so that the shot image contains, for example, degradation due to lens aberration and degradation due to the characteristics of the LED display 12.

Generally, video cameras have a function for correcting degradation caused by lens aberration. With this function, for example, a gain is applied to an image signal obtained from the sensor, and a geometric transformation is performed on a shot image. If the degradation caused by lens aberration is corrected using the conventional function that has been built into the video camera, the image quality of the shot image will be degraded, such as with increased noise and a narrower angle of view.

In addition, since the position and attitude of the video camera continues to change during shooting, the state of deterioration caused by the characteristics of the LED display also continues to change. Therefore, it is difficult to optimally correct the degradation caused by the characteristics of the LED display for each local area within the camera during shooting.

Correcting these types of degradation as a post-process after shooting would increase the amount of work required to produce movies, dramas, and other works using the shot images.

One embodiment of the present technology has been devised with the above points in mind, in which a technology is proposed that can improve the image quality of a display image appearing in a captured image by making an appropriate correction to the display image based on a result of detecting deterioration that occurs on the LED display 12 appearing in the shot image. The present embodiment will be described in detail below.

<2. Configuration and Operation of Shooting System>

Configuration of Information Processing Device

Figure 4:
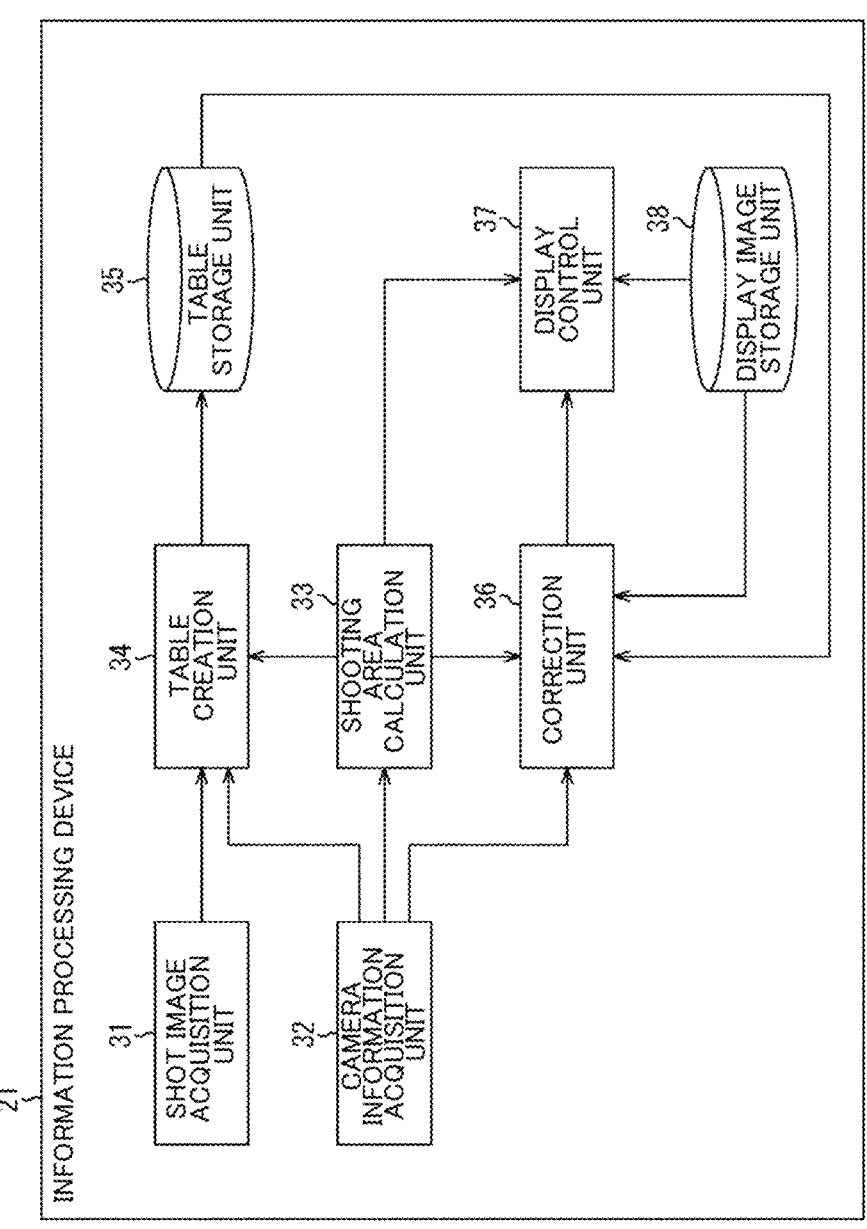
FIG. 4 is a block diagram illustrating a configuration example of an information processing device.

FIG. 4 is a block diagram illustrating a configuration example of the information processing device 21.

As described above, the information processing device 21 of FIG. 4 controls the LED display 12 based on the position, attitude, and settings of the video camera 11. Before the actual shooting (shooting of the subject), the information processing device 21 calculates a correction value used to correct the display image based on a shot image in which the LED display 12 displaying a calibration pattern appears. Thereafter, in the actual shooting, the information processing device 21 corrects the display image using the correction value, and causes the LED display 12 to display the corrected display image.

As illustrated in FIG. 4, the information processing device 21 includes a shot image acquisition unit 31, a camera information acquisition unit 32, a shooting area calculation unit 33, a table creation unit 34, a table storage unit 35, a correction unit 36, a display control unit 37, and a display image storage unit 38.

The shot image acquisition unit 31 acquires a shot image shot by the video camera 11 and supplies the shot image to the table creation unit 34. This shot image is acquired by shooting the LED display 12 displaying the calibration pattern while changing at least one of the position, attitude, and settings of the video camera 11.

The camera information acquisition unit 32 acquires the position and attitude of the video camera 11. The position and attitude of the video camera 11 are acquired, for example, by tracking using an infrared (IR) camera placed in a studio and a marker formed of a retroreflective material attached to the video camera 11.

The camera information acquisition unit 32 also acquires the settings of the video camera 11, including the focal length, aperture, and the like. The camera information acquisition unit 32 supplies camera information indicating the position, attitude, and settings of the video camera 11 to the shooting area calculation unit 33, the table creation unit 34, and the correction unit 36.

Based on the camera information supplied from the camera information acquisition unit 32, the shooting area calculation unit 33 calculates an area (shooting area) on the LED display 12 included in the shooting range of the video camera 11 and an angle (viewing angle) of the video camera 11 relative to each pixel of the LED display 12. The shooting area calculation unit 33 supplies information indicating the viewing angle and the shooting area to the table creation unit 34, the correction unit 36, and the display control unit 37.

Based on the shot video supplied from the shot image acquisition unit 31, the table creation unit 34 calculates a correction value used to correct degradation contained in the shot video. For example, the table creation unit 34 calculates as the correction value a vector for each pixel of the LED display 12 or a gain for each channel of each pixel of the LED display 12. The correction value calculated by the table creation unit 34 will be described in detail later.

The table creation unit 34 creates a correction value table in which correction values for the settings of the video camera 11 acquired by the camera information acquisition unit 32 and the viewing angle identified by the shooting area calculation unit 33 are recorded. The table creation unit 34 supplies the created correction value table to the table storage unit 35.

The table storage unit 35 stores the correction value table supplied from the table creation unit 34.

The correction unit 36 refers to the correction value table stored in the table storage unit 35 to acquire a correction value for the settings of the video camera 11 acquired by the camera information acquisition unit 32 and the viewing angle identified by the shooting area calculation unit 33. The correction unit 36 acquires a display image from the display image storage unit 38, and corrects the display image using the correction value. The correction unit 36 supplies the corrected display image to the display control unit 37.

The display control unit 37 acquires a calibration pattern from the display image storage unit 38. The display control unit 37 causes the LED display 12 to display the calibration pattern acquired from the display image storage unit 38 or the corrected display image supplied from the correction unit 36. The display control unit 37 controls the LED display 12 so that the calibration pattern or a portion of the corrected display image is displayed in the shooting area identified by the shooting area calculation unit 33.

The display image storage unit 38 stores images to be displayed on the LED display 12, such as display images and calibration patterns, in advance.

Operation of Conventional Shooting System

Figure 5:
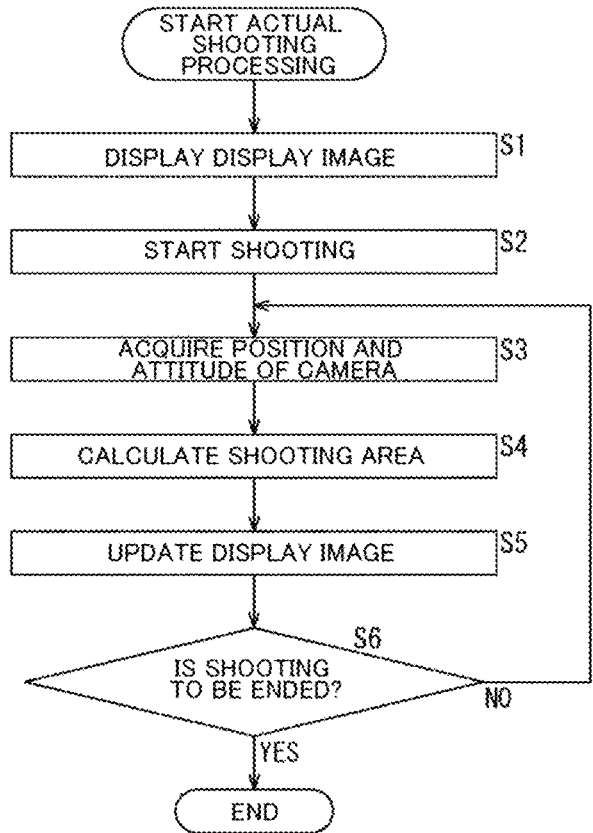
FIG. 5 is a flowchart illustrating actual shooting processing performed by a conventional shooting system.

Main shooting processing performed by a conventional shooting system will be described with reference to a flowchart of FIG. 5. The actual shooting processing achieves shooting using virtual production.

In step S1, the LED display displays a display image.

In step S2, the video camera starts shooting.

In step S3, the information processing device acquires the position and attitude of the video camera. The information processing device also acquires the settings of the video camera.

In step S4, the information processing device calculates a shooting area based on the position, attitude, and settings of the video camera.

In step S5, the information processing device updates the display image to be displayed on the LED display based on the shooting area. Specifically, the information processing device controls the LED display so that a portion of the display image is displayed in the shooting area.

In step S6, the information processing device determines whether or not to end the shooting.

If it is determined in step S6 that the shooting is not to be ended, the processing returns to step S3 to repeat the subsequent steps of processing.

On the other hand, if it is determined in step S6 that the shooting is to be ended, the actual shooting processing ends.

Operation of Shooting System 1 of Present Technology

The processing performed by the shooting system 1 of the present technology includes pre-shooting preparation processing for creating a correction value table before the actual shooting and actual shooting processing for actually shooting a subject.

Figure 6:
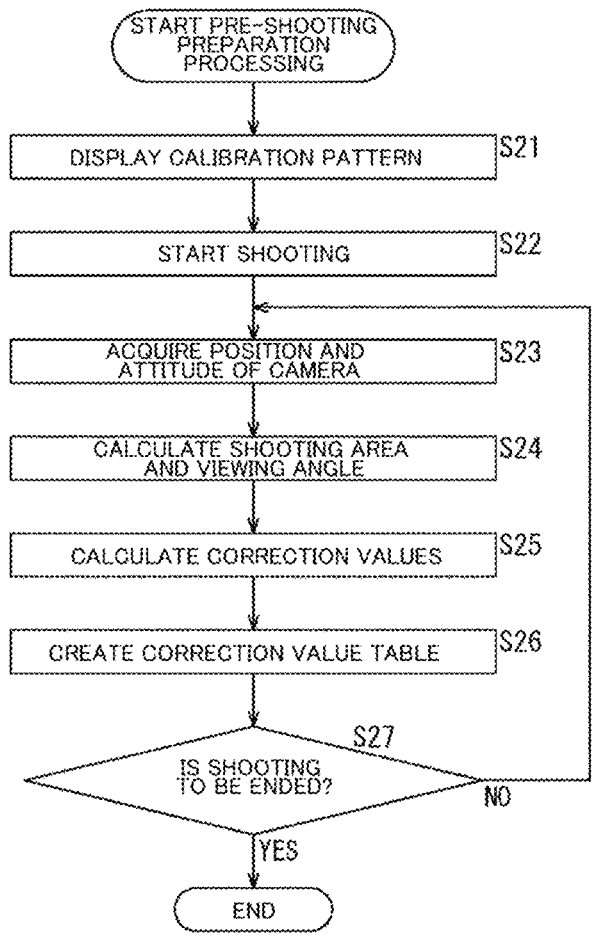
FIG. 6 is a flowchart illustrating pre-shooting preparation processing performed by the shooting system of the present technology.

The pre-shooting preparation processing performed by the shooting system 1 of the present technology will be described with reference to a flowchart of FIG. 6.

In step S21, the LED display 12 displays a calibration pattern.

In step S22, the video camera 11 starts shooting using the same lens as that used in the actual shooting. The shot image acquisition unit 31 starts acquiring a shot image shot by the video camera 11.

In step S23, the camera information acquisition unit 32 acquires the position and attitude of the video camera 11. The camera information acquisition unit 32 also acquires the settings of the video camera 11.

In step S24, the shooting area calculation unit 33 calculates a shooting area and a viewing angle based on the position, attitude, and settings of the video camera 11. The display control unit 37 controls the LED display 12 so that the calibration pattern is displayed in the shooting area.

In step S25, the table creation unit 34 calculates a correction value based on the shot image of the LED display 12 displaying the calibration pattern.

In step S26, the table creation unit 34 creates a correction value table in which correction values for the settings of the video camera 11 and the viewing angle are recorded.

In step S27, the information processing device 21 determines whether or not to end the shooting.

If it is determined in step S27 that the shooting is not to be ended, the processing returns to step S23 to perform the subsequent steps of processing. Specifically, the video camera 11 shoots the LED display 12 displaying the calibration pattern while changing at least one of the position, attitude, and settings, and the table creation unit 34 continues to record correction values for the settings and viewing angle of the video camera 11 in the correction value table.

If it is determined in step S27 that the shooting is to be ended, the pre-shooting preparation processing ends.

Figure 7:
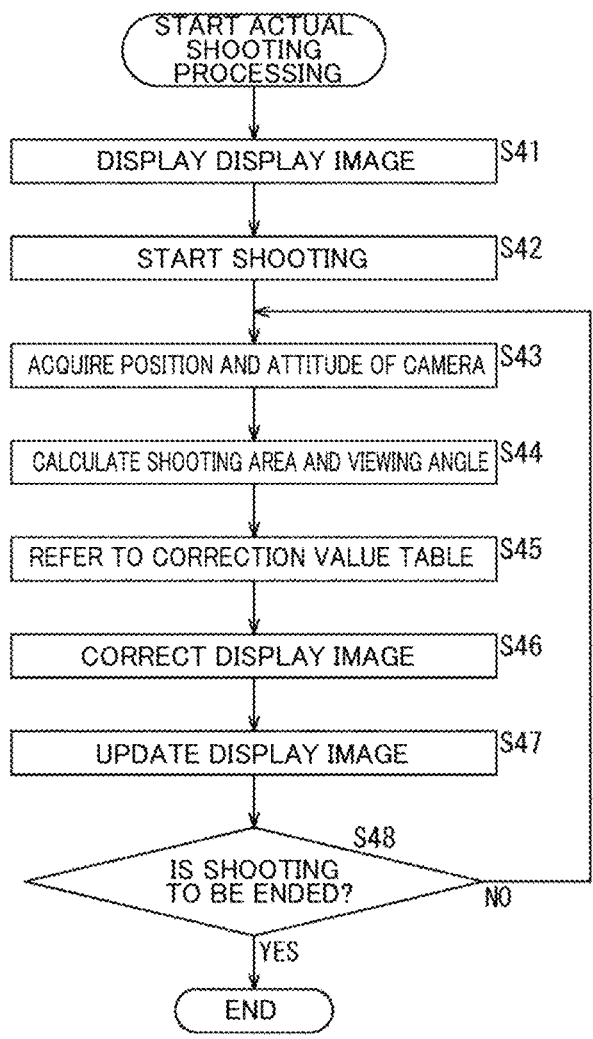
FIG. 7 is a flowchart illustrating actual shooting processing performed by the shooting system of the present technology.

Next, the actual shooting processing performed by the shooting system 1 of the present technology will be described with reference to a flowchart of FIG. 7.

In step S41, the LED display 12 displays a display image.

In step S42, the video camera 11 starts shooting a subject. The shot image acquisition unit 31 starts acquiring a shot image shot by the video camera 11.

In step S43, the camera information acquisition unit 32 acquires the position and attitude of the video camera 11. The camera information acquisition unit 32 also acquires the settings of the video camera 11.

In step S44, the shooting area calculation unit 33 calculates a shooting area and a viewing angle based on the position, attitude, and settings of the video camera 11.

In step S45, the correction unit 36 refers to the correction value table to acquire a correction value for the settings and viewing angle of the video camera 11.

In step S46, the correction unit 36 corrects the display image using the correction value.

In step S47, the display control unit 37 updates the display image to be displayed on the LED display 12 based on the shooting area. Specifically, the information processing device 21 controls the LED display 12 so that a portion of the corrected display image is displayed in the shooting area.

In step S48, the information processing device 21 determines whether or not to end the shooting.

If it is determined in step S48 that the shooting is not to be ended, the processing returns to step S43 to perform the subsequent steps of processing.

If it is determined in step S48 that the shooting is to be ended, the actual shooting processing ends.

In the actual shooting processing of the shooting system 1 of the present technology, compared to the actual shooting processing of the conventional shooting system, processing of referring to a correction value table (step S45) and processing of correcting the display image (step S46) are added before the processing of updating the display image.

In the shooting system 1 of the present technology, compared to the conventional shooting system, it is necessary to perform pre-shooting preparation processing in advance. However, once the pre-shooting preparation processing is completed, the shooting system 1 can acquire a shot image that does not contain degradation simply by referring to the correction value table.

<3. How to Correct Each Type of Deterioration>

In shooting using virtual production, the following types of degradation are likely to occur in a shot image due to at least one of the shooting conditions, such as the position of the video camera 11, the attitude of the video camera, and the settings of the video camera 11 as well as the lighting environment of the studio.

Distortion and shading are likely to occur around the edges of the image.

Due to the viewing angle characteristics of the LED display 12, the brightness, color, and other aspects of the LED display 12 may appear differently in each local area of the LED display 12 shot in the shot image.

Because the lighting environment for the display image in the background and the subject in the foreground are different, color tones may be deviated in the shot image, such as their color tones being different from each other.

The information processing device 21 reflects a correction corresponding to a post-process for each of these types of degradation to display of the image on the LED display 12 based on at least one of the position of the video camera 11, the attitude of the video camera 11, and the shooting conditions. A method for correcting a display image by the information processing device 21 will be described below for each type of deterioration.

Distortion Aberration

Figure 8:
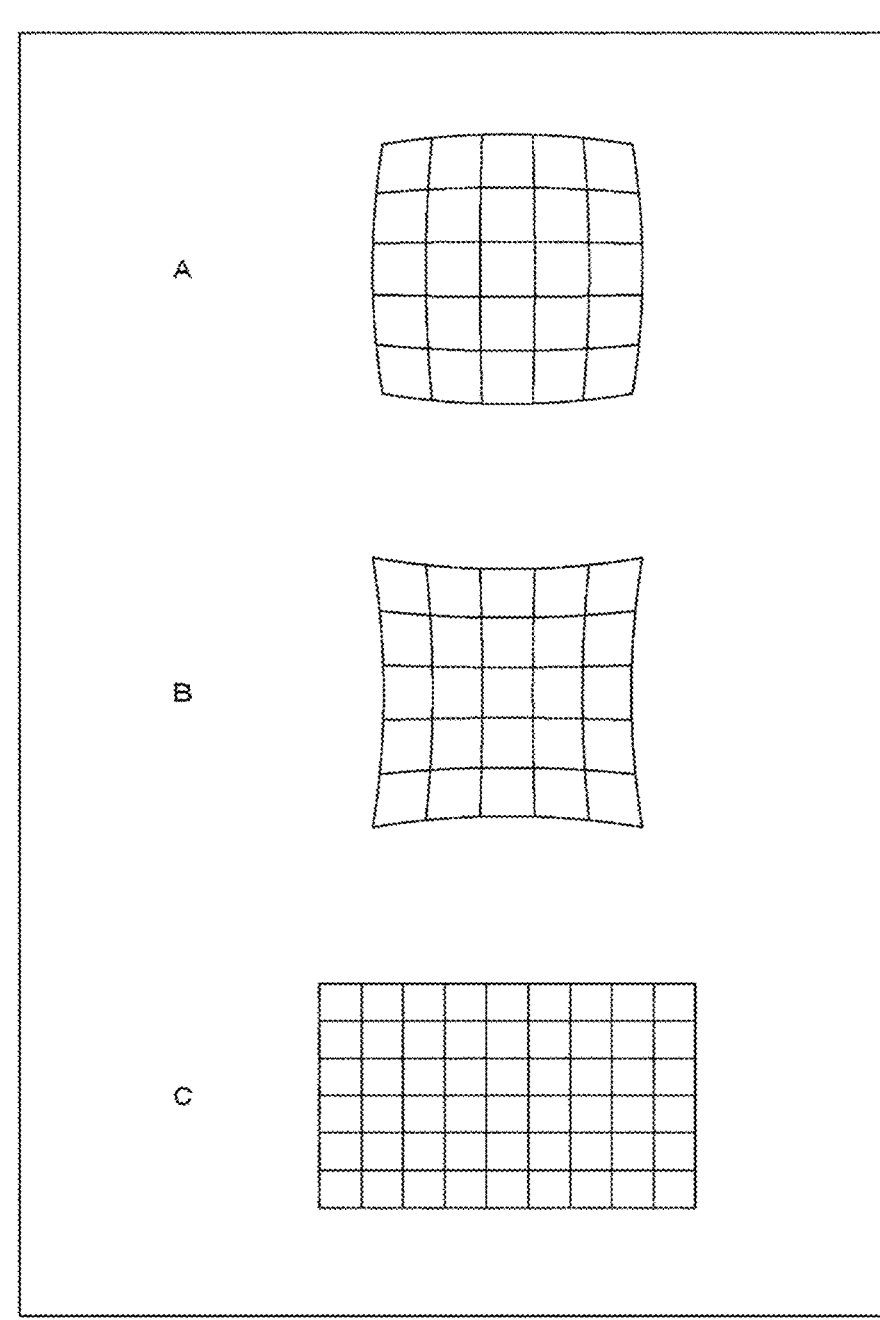
FIG. 8 illustrates an example of distortion aberration and an example of a grid pattern.

When a rectangular object is shot, the rectangular object in the shot image may be distorted into a barrel shape as illustrated in A of FIG. 8, or into a pincushion shape as illustrated in B of FIG. 8. Distortion aberration is a phenomenon in which a rectangular object does not appear as a rectangle in a shot image. Distortion aberration occurs due to the arrangement of the lens and the aperture.

During preparation before the actual shooting, the LED display 12 displays a grid pattern illustrated in C of FIG. 8 as a calibration pattern. When the coordinates of each pixel of the video camera 11 are $p_x$ and the coordinates corresponding to each pixel after distortion aberration occurs are $p'_x$, the table creation unit 34 detects the movement amount of the coordinates of each grid point in the shot grid pattern as a distortion amount $p_x p'_x$, and defines a vector quantity $p'_x p_x$ that cancels the distortion amount $p_x p'_x$ as a correction value.

Figure 9:
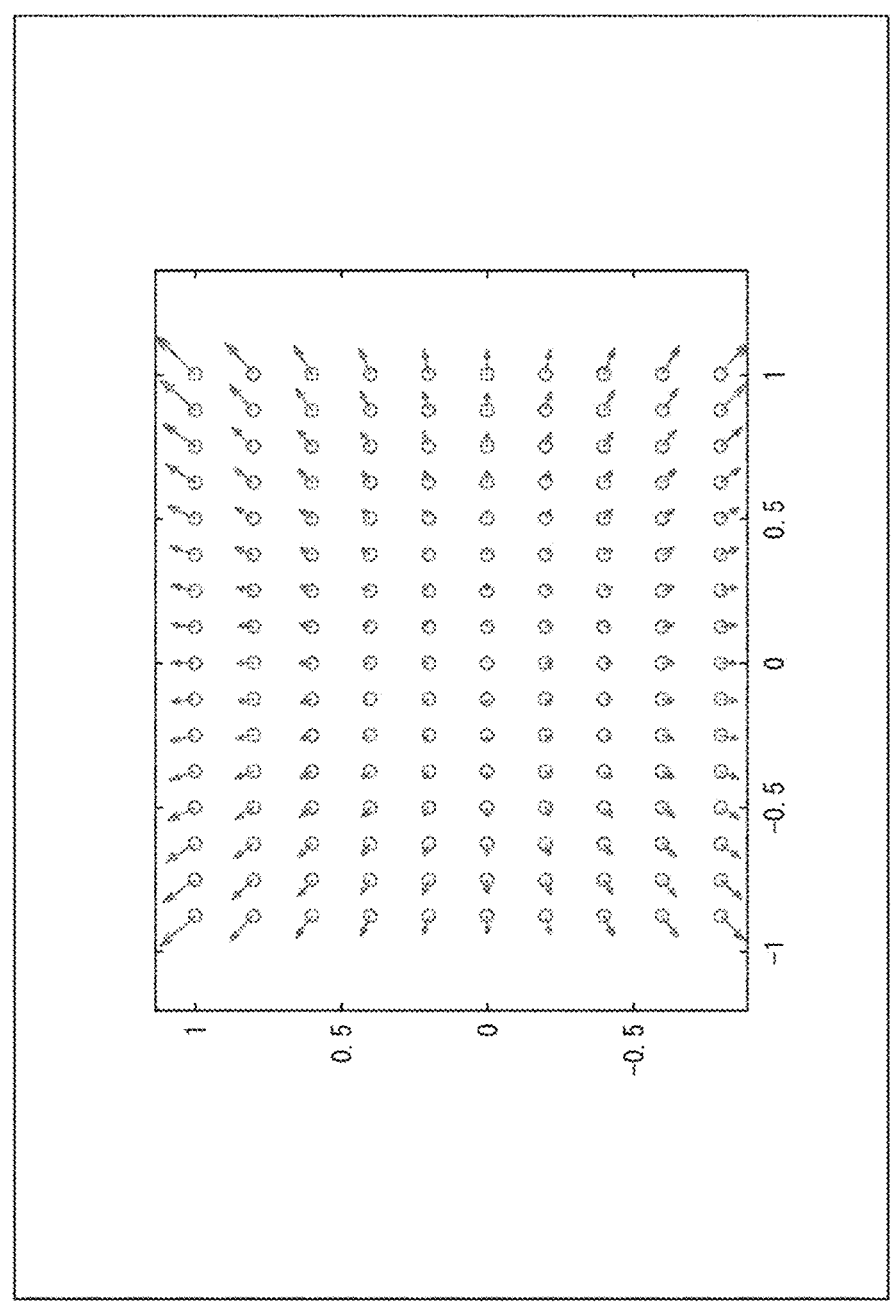
FIG. 9 illustrates an example of a distortion amount $p_x p'_x$.

FIG. 9 illustrates an example of the distortion amount $p_x p'_x$. In FIG. 9, the position $p_x$ of each pixel of the video camera 11 before distortion is indicated by a circle, and the distortion amount $p_x p'_x$ of each pixel is indicated by an arrow.

In the example of FIG. 9, the distortion amount of each pixel in a central portion is small, while the amount of distortion of each pixel in a peripheral portion is large.

Chromatic Aberration of Magnification

Figure 10:
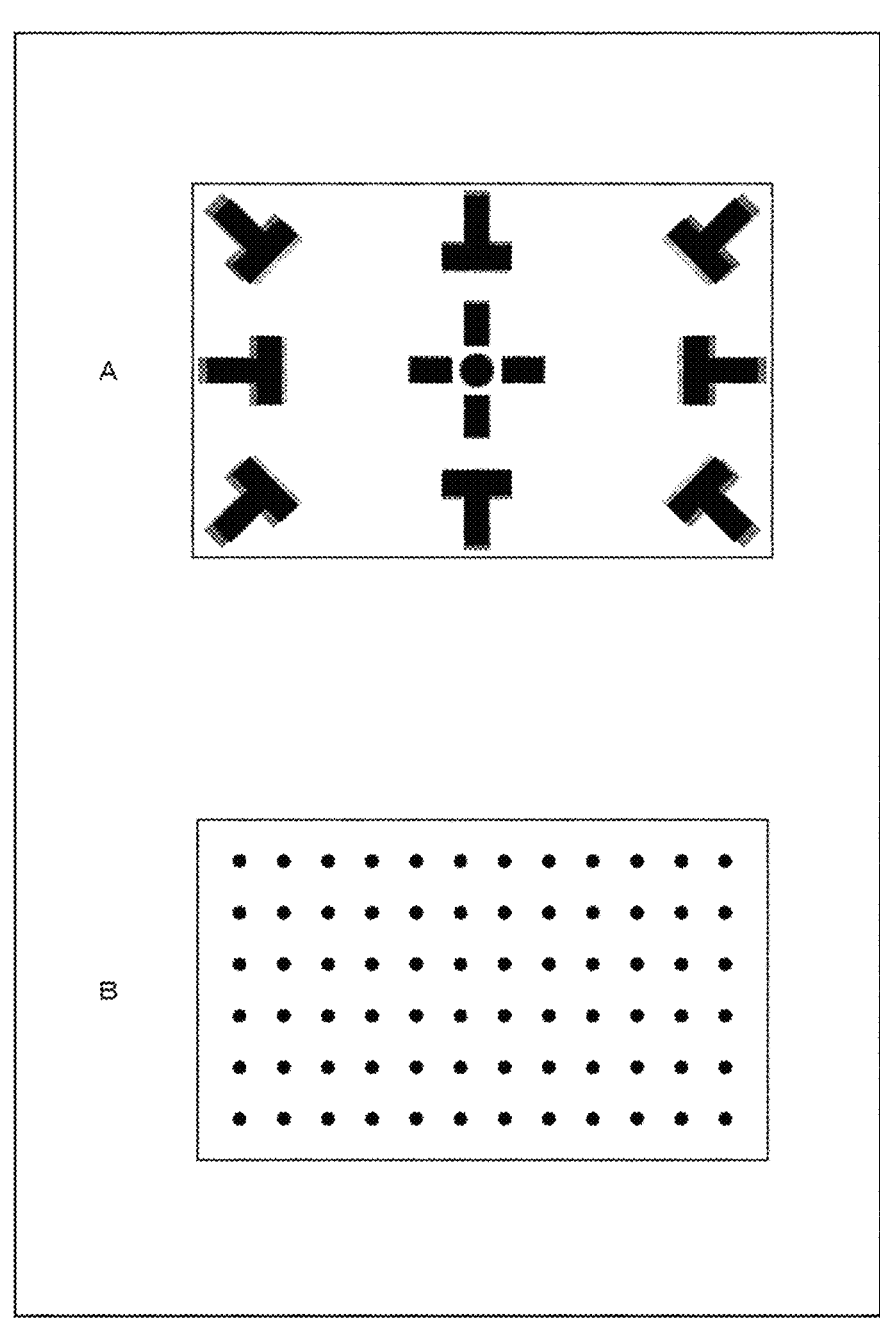
FIG. 10 illustrates an example of magnification aberration and an example of a dot pattern.

Chromatic aberration of magnification is a phenomenon in which colors are shifted, particularly in the periphery of an image, causing unnatural color bleeding at the edges, as illustrated in A of FIG. 10. Chromatic aberration of magnification occurs due to the refractive index of a lens.

During preparation before the actual shooting, the LED display 12 displays the grid pattern illustrated in C of FIG. 8 or a dot pattern illustrated in B of FIG. 10 as a calibration pattern. When a dot pattern is displayed as a calibration pattern, the table creation unit 34 detects shift amounts of the dot positions of the R channel and B channel on the basis of the dot positions of the G channel in the shot image, and defines the vector quantities that cancel the shifts as correction values.

Figure 11:
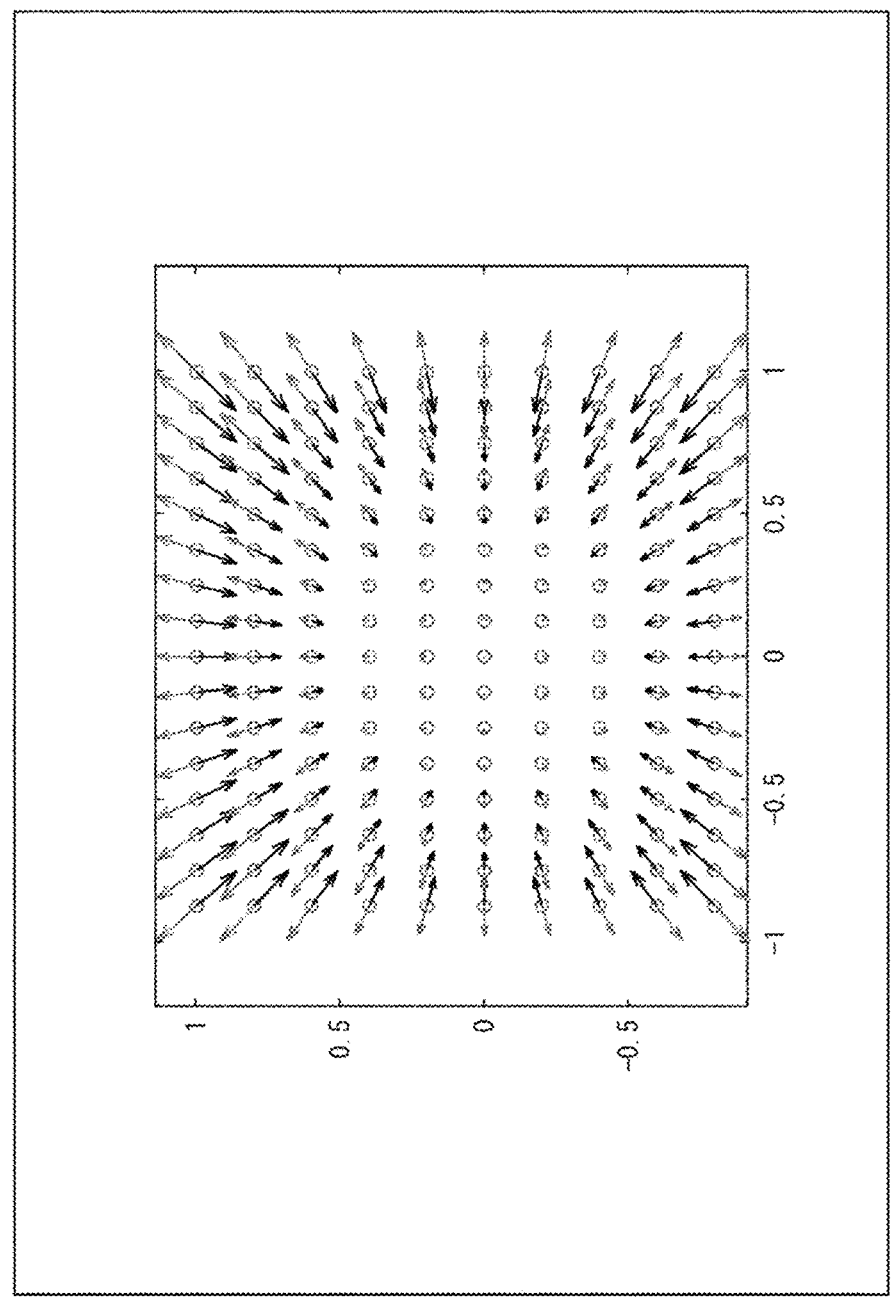
FIG. 11 illustrates an example of shift amounts of each channel.

FIG. 11 illustrates an example of shift amounts of each channel. In FIG. 11, each position of the G channel is indicated by a circle. Each shift amount of the R channel is indicated by a black arrow, and each shift amount of the B channel is indicated by a gray arrow.

In the example of FIG. 11, the shift amounts of the pixels in the central portion are small, while the shift amounts of the pixels in the peripheral portion are large. In addition, the positions of the R channel are shifted from the positions of the G channel toward the central portion, and the positions of the B channel are shifted from the positions of the G channel toward the peripheral portion.

Flow of Calculating Correction Values for Distortion Aberration and Chromatic Aberration of Magnification The information processing device 21 can simultaneously calculate correction values for distortion aberration and chromatic aberration of magnification based on a shot image in which the LED display 12 displaying a certain calibration pattern appears.

Figure 12:
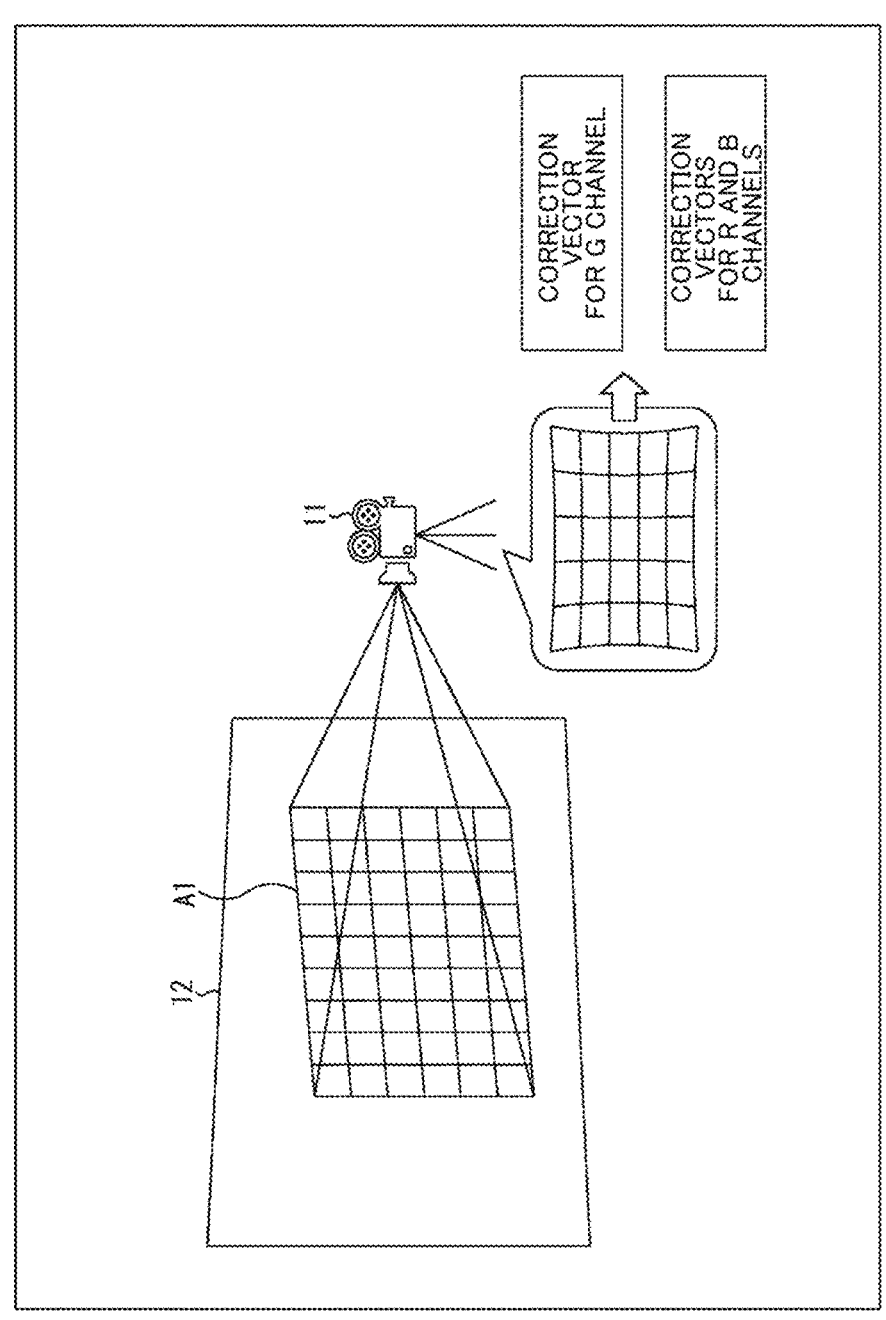
FIG. 12 is a diagram illustrating an example of a method for calculating correction values for distortion aberration and chromatic aberration of magnification.

FIG. 12 is a diagram illustrating an example of a method for calculating correction values for distortion aberration and chromatic aberration of magnification.

To calculate correction values for distortion aberration and chromatic aberration of magnification, a calibration pattern such as a grid pattern or a dot pattern is displayed in the shooting area A1 on the LED display 12 as illustrated in FIG. 12.

The table creation unit 34 calculates geometric distortion and color shifts of a calibration pattern, shot by the video camera 11, appearing in a shot image illustrated in a balloon in FIG. 12.

Specifically, as indicated on the head side of an arrow in FIG. 12, the table creation unit 34 calculates a geometric distortion vector based on the G channel of the shot image, and calculates an inverse vector of the distortion vector as a correction vector (correction value). The table creation unit 34 also calculates a shift amount vector on the basis of the G channel of the shot image, based on the R channel and B channel of the shot image, and calculates an inverse vector of the shift amount vector as a correction vector. The distortion vector and the shift amount vector are calculated for each pixel or for each block including a plurality of pixels. The pixels are divided into blocks within a range in which the distortion amount and the shift amount do not change significantly depending on their coordinates.

The table creation unit 34 creates a vector map in which the correction vectors for the G channel, the R channel, and the B channel are collected, and records the vector map in a correction value table. When the focal length of the video camera 11 changes, the degrees of distortion aberration and chromatic aberration of magnification also change, so that a vector map is created for each focal length that may be set during the actual shooting.

During the actual shooting, the correction unit 36 refers to a vector map for the focal length of the video camera 11, and converts the vector map in the camera coordinate system into a vector map in the display coordinate system based on the shooting area. The correction unit 36 performs a geometric transformation on each of the R channel, G channel, and R channel of the display image based on the vector map in the display coordinate system. The correction unit 36 performs the geometric transformation on each channel to perform a correction corresponding to a post-process for correcting distortion aberration and chromatic aberration of magnification occurring on the LED display 12 in the shot image. This makes it possible for the information processing device 21 to prevent distortion aberration and chromatic aberration of magnification from occurring in the shot image.

Brightness Shading and Color Shading

Brightness shading is a phenomenon in which a portion of a shot image becomes dark, and color shading is a phenomenon in which a portion of a shot image has a strange color. For example, as illustrated in A of FIG. 13, shading in brightness or color occurs at the four corners of a shot image. Brightness shading is also called peripheral dimming, and color shading is also called color cast. Shading occurs due to factors such as the optical path length of light that passes through a lens and reaches a sensor becoming longer as the image height increases, and light entering the sensor at an oblique angle.

Figure 13:
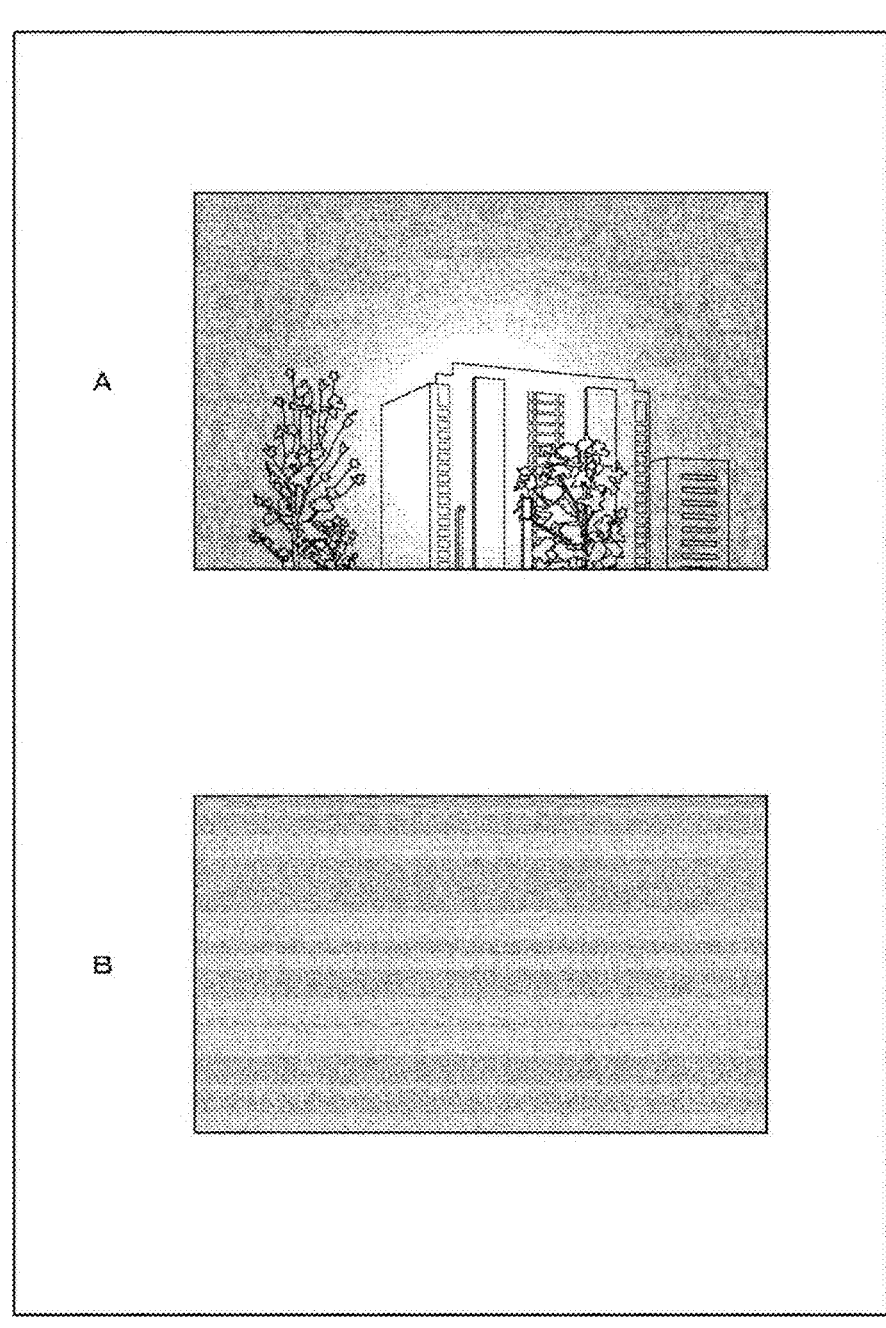
FIG. 13 illustrates an example of shading and an example of a gray pattern.

During preparation before the actual shooting, the LED display 12 displays a fully gray pattern (gray pattern) as illustrated in B of FIG. 13 as a calibration pattern. The table creation unit 34 compares the gray pattern appearing in the shot image with the gray pattern itself displayed on the LED display 12, and detects the dimming amount and the RGB shift amount for each local area of the shot image. The table creation unit 34 defines, as a correction value, a gain that cancels the dimming amount or the RGB shift amount. The information processing device 21 performs a correction corresponding to a post-process for correcting brightness shading and color shading occurring on the LED display 12 appearing in the shot image by multiplying the pixel value of each pixel of the display image by the gain.

Brightness Degradation and Color Shift Due to Viewing Angle Characteristics of LED Display 12

Figure 14:
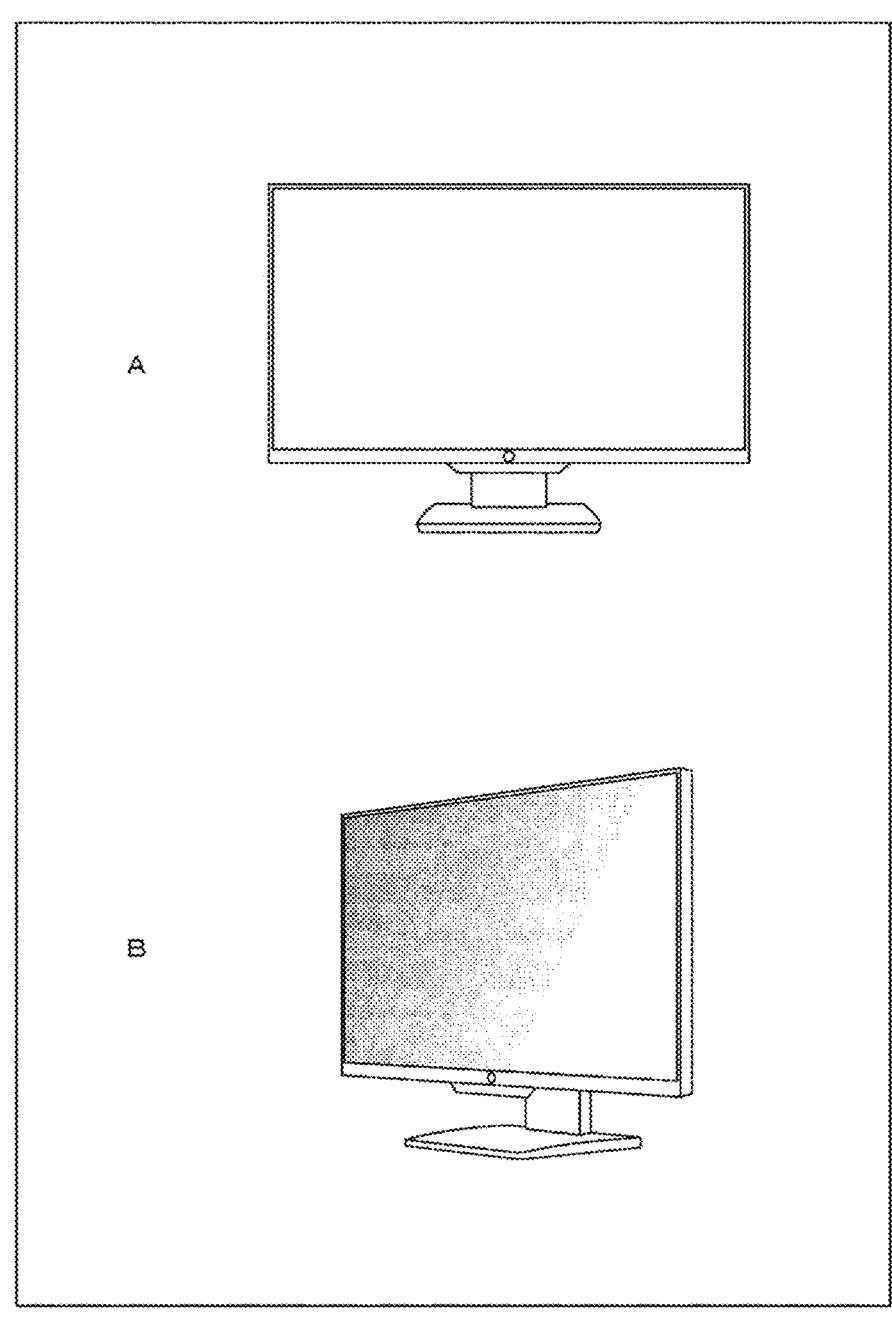
FIG. 14 illustrates an example of brightness degradation and color shift due to the viewing angle characteristics of a display.

On a highly directional display such as an LED display, a display image can be seen normally when viewed from the front, as illustrated in A of FIG. 14, but when viewed from an oblique angle, as illustrated in B of FIG. 14, the image appears to be with a degraded brightness or a shifted color balance.

Figure 15:
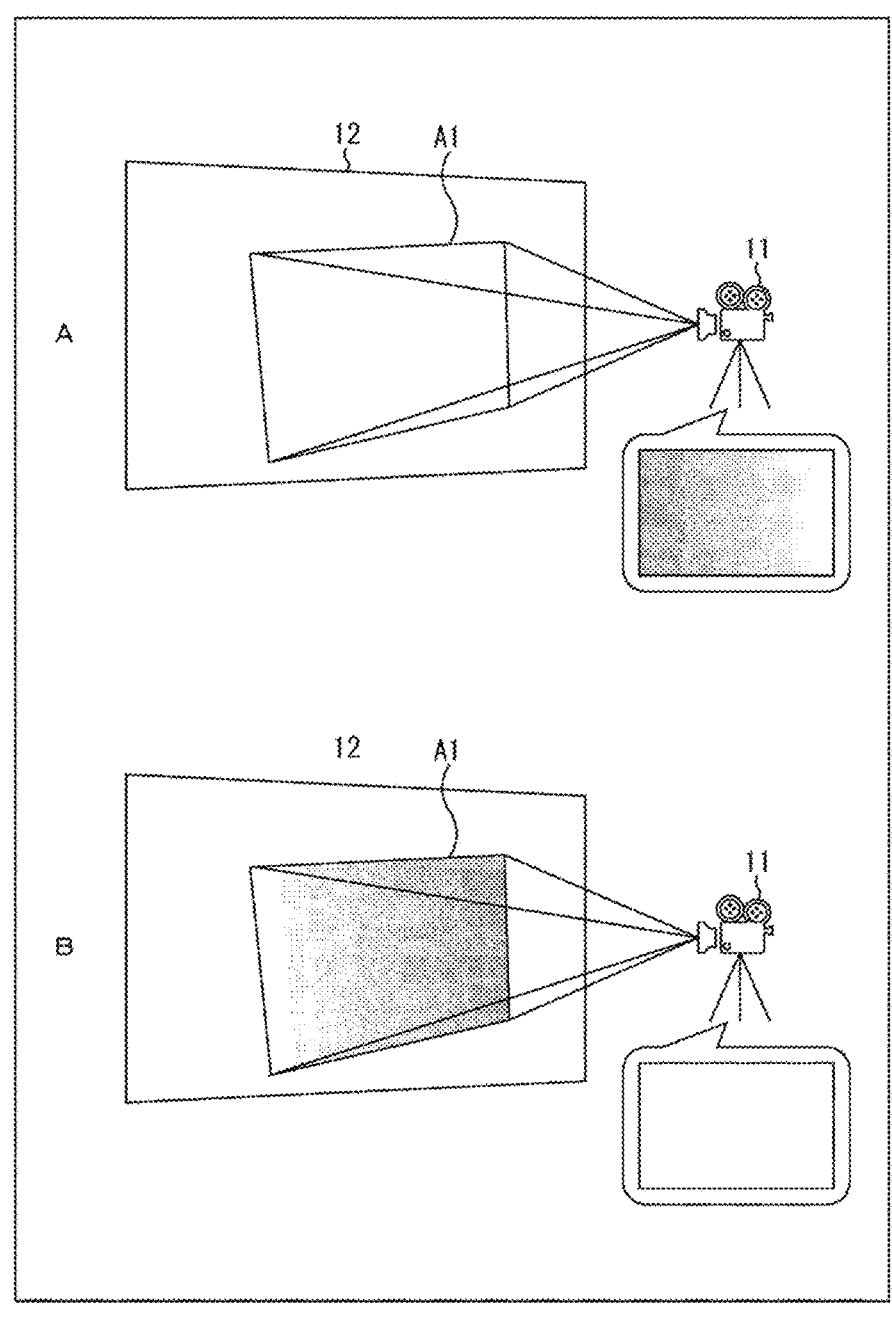
FIG. 15 illustrates an example of brightness degradation and color shift due to the viewing angle characteristics of an LED display during shooting in virtual production.

In shooting using virtual production, the brightness and color of the display image appearing in the shot image may differ from the brightness and color of the display image displayed on the LED display 12 depending on the attitude of the video camera 11. For example, even when a uniform display image is displayed in the shooting area A1 of the LED display 12 as illustrated in A of FIG. 15, a portion of the display image appearing in the captured image may be colored depending on the position and attitude of the video camera 11 as illustrated in a balloon in A of FIG. 15.

Therefore, during preparation before the actual shooting, the LED display 12 displays a gray pattern as a calibration pattern. The table creation unit 34 calculates a shooting area according to the position and attitude of the video camera 11, and calculates an angle (viewing angle) at which the light to enter the video camera 11 is emitted from each pixel in the shooting area. The table creation unit 34 defines, as a correction value, a gain that cancels the brightness degradation and color shift that occur in the shot image depending on the viewing angle. The information processing device 21 performs a correction corresponding to a post-process for correcting the brightness degradation and color shift caused by the viewing angle characteristics of the LED display 12 by making the inverse correction of the brightness degradation and color shift to the display image. The information processing device 21 corrects the display image, thereby controlling display of the image on the LED display 12 so that the image appears as desired for the position and attitude of the video camera 11, as illustrated in B of FIG. 15.

Flow of Calculating Correction Values for Brightness Shading, Color Shading, and Brightness Degradation and Color Shift Due to the Viewing Angle Characteristics of the LED Display 12

The information processing device 21 can calculate, based on the RGB balance in a shot image in which the LED display 12 displaying a gray pattern appears, correction values for brightness shading, color shading, and brightness degradation and color shift due to the viewing angle characteristics of the LED display 12.

When calculating correction values for brightness shading, color shading, and brightness degradation and color shift due to the viewing angle characteristics of the LED display 12, the table creation unit 34 first calculates correction values for brightness degradation and color shift due to the viewing angle characteristics.

Specifically, first, shooting is performed with the video camera 11 facing the LED display 12 directly. The table creation unit 34 sets an average value $avr_g$ of the pixel values of the G channel in the central portion of the shot image shot in this state as a reference of correction values for brightness degradation and color shift. Since the influence of brightness shading and color shading is extremely small in the central portion of the shot image, correction values are calculated based on the pixel values in the central portion of the shot image (e.g., in the range of 0 to 20% of the image height).

11

Figure 16:
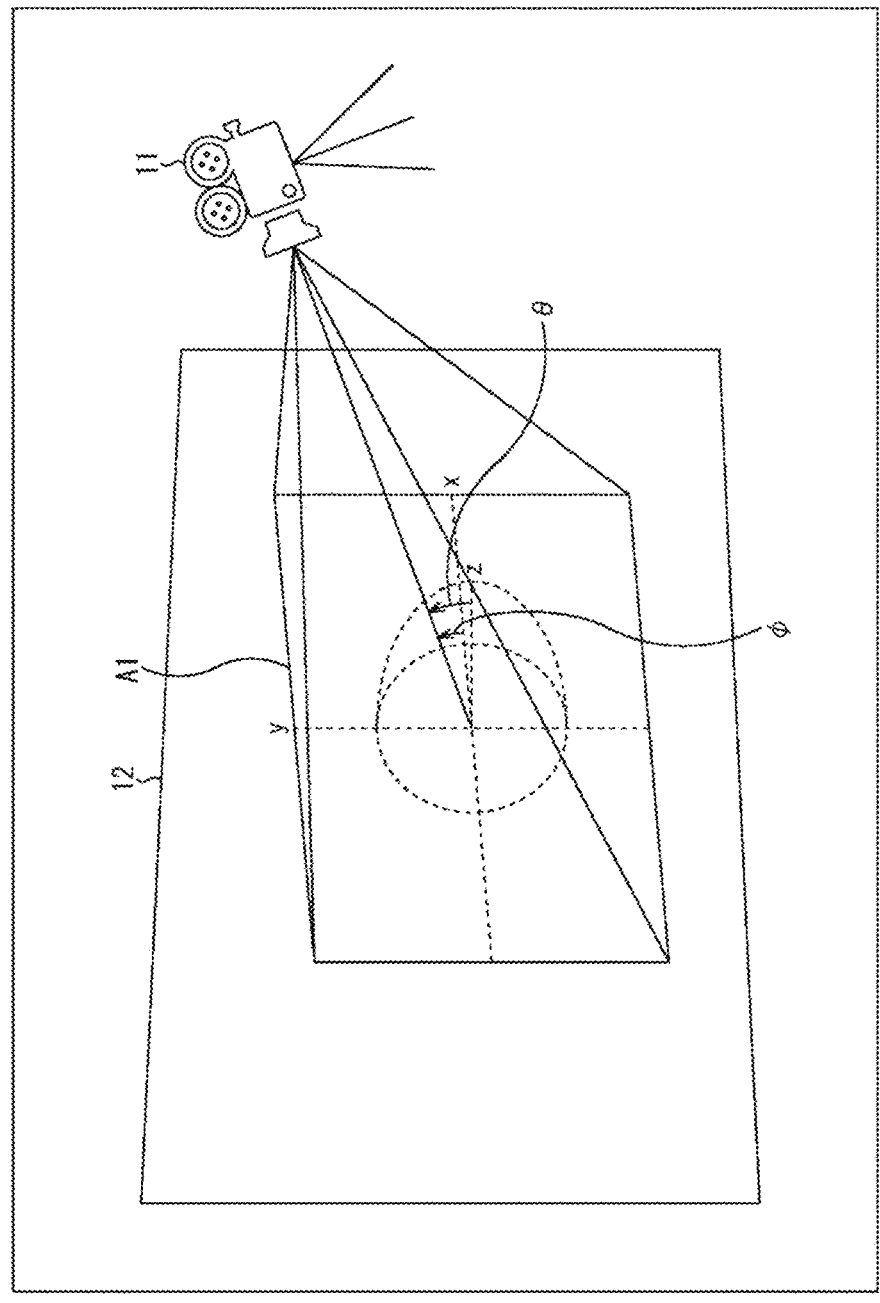
FIG. 16 is a diagram illustrating an example of a viewing angle.

The angle (viewing angle) of the video camera 11 relative to each pixel of the LED display 12 is represented by a zenith angle θ and an azimuth angle φ illustrated in FIG. 16. For example, when the video camera 11 faces the LED display 12 directly, the angle of the video camera 11 relative to the pixel at the center of the shooting area is indicated as (0, 0).

When the average pixel values of the R channel, G channel, and B channel in the central portion of the shot image are $avr_r(\theta, \varphi)$, $avr_g(\theta, \varphi)$, and $avr_b(\theta, \varphi)$, gains $Disp_g(\theta, \varphi)$, $Disp_r(\theta, \varphi)$, and $Disp_b(\theta, \varphi)$ as correction values for the respective channels are represented by the following Equations (1) to (3).

[Math. 1]

$$Disp_{g(\theta,\phi)} = \frac{avr_{g(0,0)}}{avr_{g(\theta,\phi)}} \tag{1}$$

$$Disp_{r(\theta,\phi)} = \frac{avr_{g(0,0)}}{avr_{r(\theta,\phi)}} \tag{2}$$

$$Disp_{b(\theta,\phi)} = \frac{avr_{g(0,0)}}{avr_{b(\theta,\phi)}} \tag{3}$$

The gain $Disp_g(\theta, \varphi)$ is used as a correction value for brightness shift, and the gains $Disp_r(\theta, \varphi)$ and $Disp_b(\theta, \varphi)$ are used as correction values for color shift. Even when the video camera 11 shoots at a certain position, correction values for many viewing angles are required to correct the display image because the viewing angle $(\theta, \varphi)$ is different depending on each pixel in the shooting area. Accordingly, during preparation before the actual shooting, correction values for all viewing angles indicated by θ and φ are calculated.

Next, the table creation unit 34 applies the gains $Disp_r(\theta, \varphi)$, $Disp_g(\theta, \varphi)$, and $Disp_b(\theta, \varphi)$ to their respective channels of the entire shot image, and calculates correction values for brightness shading and color shading based on the resulting image. Here, on the basis of the pixel values of the G channel in the central portion of the image, the variation in the pixel values of the G channel in a local area of the image can be regarded as brightness shading, and the variation in the pixel values of the R channel and B channel can be regarded as color shading.

In the image to which the gains $Disp_r(\theta, \varphi)$, $Disp_g(\theta, \varphi)$, and $Disp_b(\theta, \varphi)$ have been applied, when the average pixel value of the G channel at the central portion is $avr'_g$ and the pixel values of the R channel, G channel, and B channel of a certain pixel $(x, y)$ are $val'_r(x, y)$, $val'_g(x, y)$, and $val'_b(x, y)$, respectively, a gain $Sh_g(x, y)$ as a correction value for brightness shading is represented by the following Equation (4). Gains $Sh_r(x, y)$ and $Sh_b(x, y)$ as correction values for color shading are represented by the following Equations (5) and (6).

[Math. 2]

$$Sh_g(x, y) = \frac{avr'_g}{val'_g(x, y)} \tag{4}$$

$$Sh_r(x, y) = \frac{avr'_g}{val'_r(x, y)} \tag{5}$$

$$Sh_b(x, y) = \frac{avr'_g}{val'_b(x, y)} \tag{6}$$

12

Since the brightness shading and color shading are invariant with respect to the angle between the video camera 11 and the LED display 12, the table creation unit 34 only needs to calculate a correction value for a certain angle. The table creation unit 34 creates a map in which the gains $Sh_g(x, y)$, $Sh_r(x, y)$, and $Sh_b(x, y)$ of each pixel in the camera coordinate system are collected, and records the map in a correction value table.

During the actual shooting, the shooting area calculation unit 33 first calculates an angle $(\theta, \varphi)$ of the video camera with respect to each pixel in the shooting area based on the shooting area on the LED display 12. Next, the correction unit 36 refers to the correction value table for each pixel or block to acquire the gains $Disp_r(\theta, \varphi)$, $Disp_g(\theta, \varphi)$, and $Disp_b(\theta, \varphi)$. The correction unit 36 multiplies the pixel values of the channels of the display image displayed in the shooting area by the gains $Disp_r(\theta, \varphi)$, $Disp_g(\theta, \varphi)$, and $Disp_b(\theta, \varphi)$, respectively.

The correction unit 36 refers to the map of correction values and converts the map of the camera coordinate system into a map of the display coordinate system based on the shooting area. The correction unit 36 multiplies the pixel values of the R channel, G channel, and R channel of each pixel of the display image by the gains as correction values based on the map of the display coordinate system. By displaying the corrected display image on the LED display 12, the shooting system 1 can prevent brightness shading, color shading, and brightness degradation and color shift due to the viewing angle characteristics of the LED display 12 from occurring in the shot image.

Color Tone Deviation

In shooting using virtual production, the color tone of the foreground, which depends on the lighting environment illuminating the foreground subject, does not necessarily match the color of the display image displayed on the LED display 12. This can cause the color tones (white balance) of the foreground and background to deviate from each other in a shot image.

Figure 17:
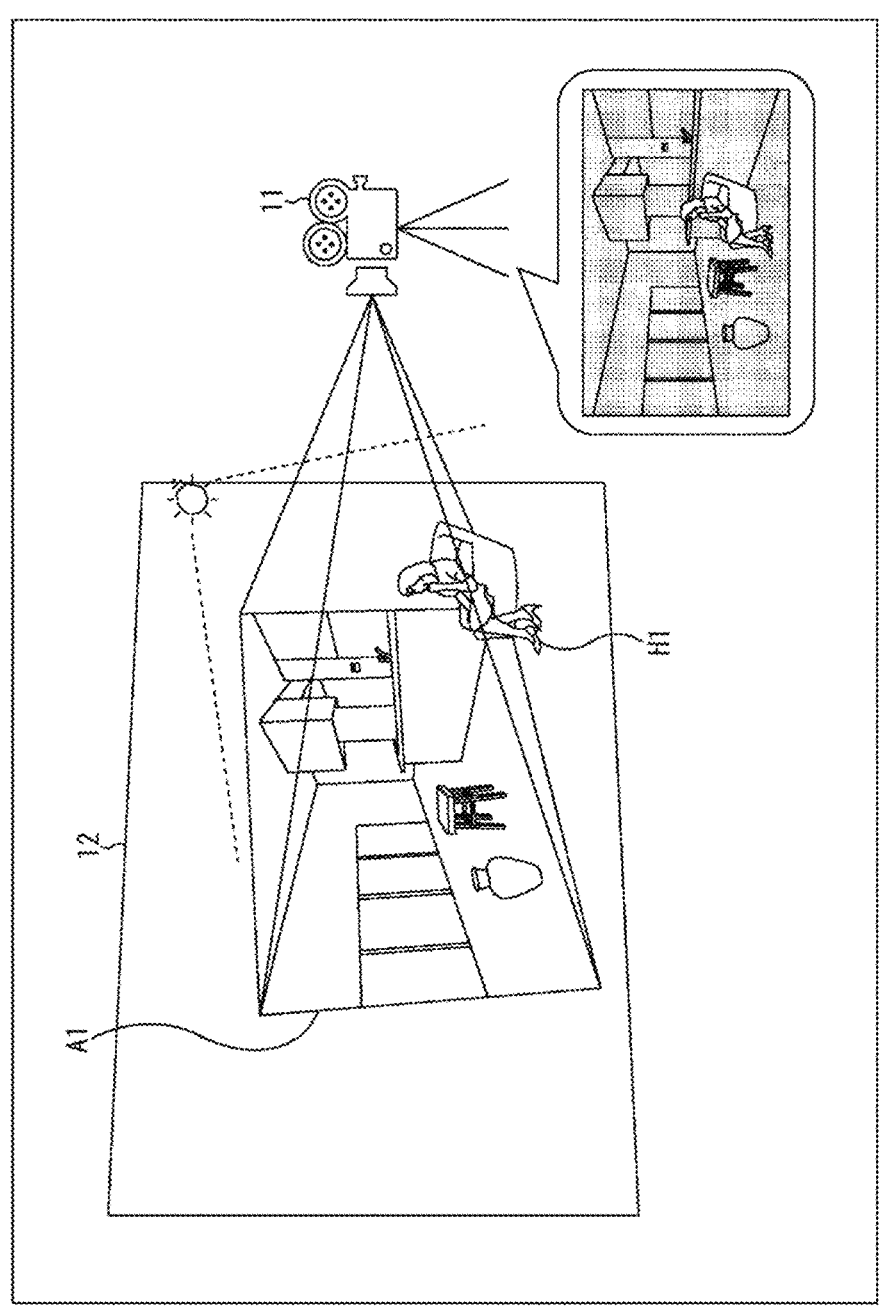
FIG. 17 is a diagram illustrating an example of a case where the color tones of the foreground and background in a shot image are deviated from each other.

FIG. 17 is a diagram illustrating an example of a case where the color tones of the foreground and background in a shot image are deviated from each other.

As illustrated in FIG. 17, when a person H1 performs in front of the LED display 12 with the display image displayed on the LED display 12 as the background, for example, although the person H1 is illuminated by lighting, a dark image may be displayed as the display image. In this case, as illustrated in a balloon in FIG. 17, the background is dark and only the person H1 will be vividly shot in a shot image.

In the example of FIG. 17, the display image is displayed only in the shooting area A1 on the LED display 12, but in reality, the display image is also displayed on the entire display surface of the LED display 12.

During preparation before the actual shooting, the LED display 12 displays the gray pattern illustrated in B of FIG. 13 as a calibration pattern. In order to distinguish between the deviation of color tones caused by the above-described brightness shading, color shading, and brightness degradation and color shift due to the viewing angle characteristics of the LED display 12 and the deviation of color tones between the foreground and background, a gray pattern that has been corrected for deterioration other than the deviation of color tones between the foreground and background is displayed on the LED display 12. The video camera 11 shoots the LED display 12 in the same lighting environment as that during the actual shooting.

With the white balance of the video camera 11 set to match the lighting environment of the studio, the table creation unit 34 detects the amount of deviation in the RGB balance (color balance) of the shot image and defines a gain that cancels the deviation in the RGB balance as a correction value. To eliminate the possibility that the brightness in the shot image will become uneven due to the position of the lighting, the table creation unit 34 calculates a correction value based on the amount of deviation in the RGB balance in the central portion of the shot image.

The table creation unit 34 uses, for example, an average value avr"$_g$ of the pixel values of the G channel in the central portion of the shot image as a reference of correction values for the color tone deviation between the foreground and background. When the average value of the pixel values of the R channel at the central portion of the shot image is avr"$_r$ and the average value of the pixel values of the B channel at the central portion of the shot image is avr"$_b$, a gain WB$_r$ as a correction value for the R channel is represented by the following Equation (7), and a gain WB$_b$ as a correction value for the B channel is represented by the following Equation (8).

[Math. 3]

$$WB_r = \frac{avr''_g}{avr''_r} \quad (7)$$

$$WB_b = \frac{avr''_g}{avr''_b} \quad (8)$$

Since the color tone deviation between the foreground and background does not change unless the lighting environment of the studio changes, the table creation unit 34 may calculate a correction value for each lighting environment. The table creation unit 34 records the calculated correction values in a correction value table.

Figure 18:
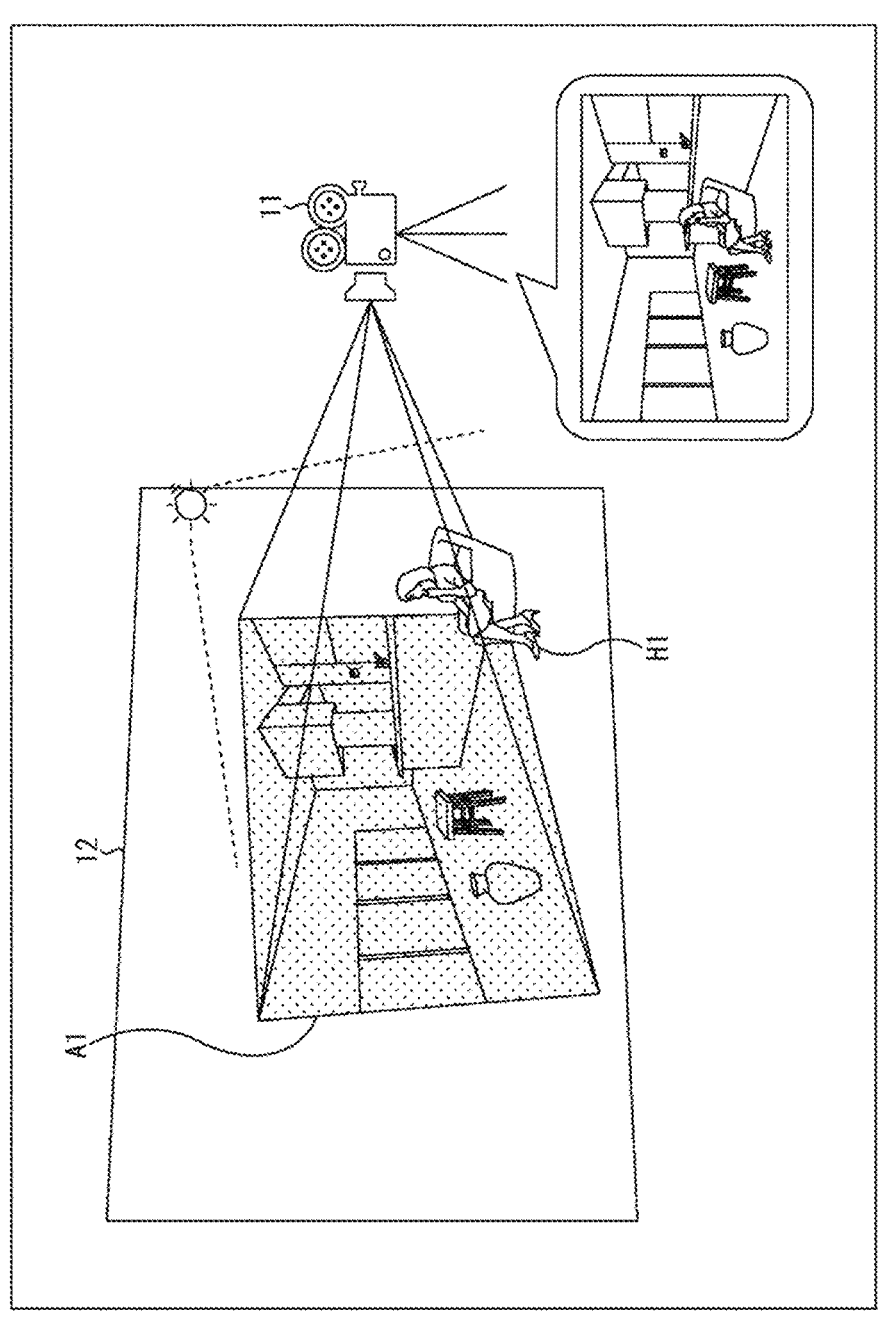
FIG. 18 is a diagram illustrating an example of a case where the colors of the foreground and background in a shot image are matched.

During the actual shooting, the correction unit 36 refers to the correction value table to acquire the gains WB$_r$ and WB$_b$ according to the lighting environment, and multiplies these gains by the pixel values of the R channel and B channel of the entire display image displayed in the shooting area on the LED display 12, respectively. By multiplying the pixel values of each channel by the corresponding gain, the correction unit 36 makes a correction to the display image corresponding to a post-process for correcting the deviation in the color balance of the display image in the shot image caused by the lighting environment of the studio. As illustrated in FIG. 18, the corrected display image is displayed on the LED display 12, and thus a shot image with a consistent overall color tone is shot, as illustrated in a balloon in FIG. 18. Therefore, it is possible to shoot a shot image with a natural color tone that does not look unnatural.

In FIG. 18, dots added to the display image displayed in the shooting area A1 indicate that the color tone of the display image, which is a dark image, has been corrected to be vivid.

As described above, in the shooting system 1, a correction is made to the display image corresponding to a post-process for degradation occurring in a shot image based on at least one of the position of the video camera 11, the attitude of the video camera 11, and the shooting condition.

The shooting system 1 can prevent degradation of the shot image by displaying the corrected image on the LED display 12. This eliminates the need for a post-process for a shot image after shooting, or makes it possible to perform the post-process with simple processing.

Rather than correcting the display image, the brightness and the like of the LED display 12 may be adjusted so that a correction corresponding to a post-process for degradation occurring in the shot image is reflected to display of the display image on the LED display 12.

<Computer>

The above-described series of processing can also be performed by hardware or software. When the series of processing is performed by software, a program for the software is embedded in dedicated hardware to be installed from a program recording medium to a computer or a general-purpose personal computer.

Figure 19:
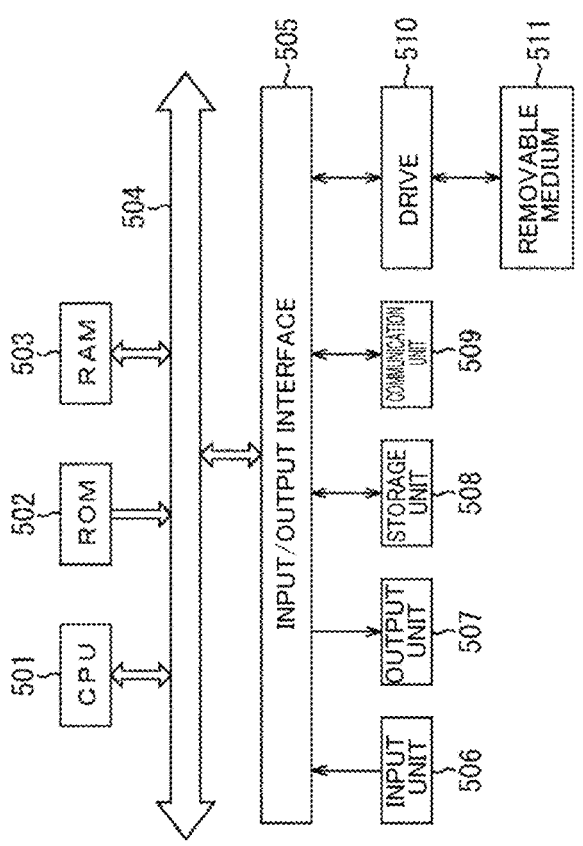
FIG. 19 is a block diagram illustrating a configuration example of computer hardware.

FIG. 19 is a block diagram illustrating a configuration example of computer hardware that performs the above-described series of processing using a program. The information processing device 21 is configured by, for example, a PC having the same configuration as the configuration illustrated in FIG. 19.

A central processing unit (CPU) 501, a read-only memory (ROM) 502, and a random access memory (RAM) 503 are connected to one another via a bus 504.

An input/output interface 505 is additionally connected to the bus 504. An input unit 506 including a keyboard and a mouse and an output unit 507 including a display and a speaker are connected to the input/output interface 505. In addition, a storage unit 508 including a hard disk and a non-volatile memory, a communication unit 509 including a network interface, and a drive 510 that drives a removable medium 511 are connected to the input/output interface 505.

In the computer configured thus, for example, the CPU 501 performs the above-described series of processing by loading a program stored in the storage unit 508 into the RAM 503 via the input/output interface 505 and the bus 504 and executing the program.

The program executed by the CPU 501 is recorded on, for example, the removable medium 511 or is provided via wired or wireless transfer media such as a local area network, the Internet, and a digital broadcast and is installed in the storage unit 508.

The program executed by the computer may be a program that performs a plurality of steps of processing in time series in the order described herein or may be a program that performs a plurality of steps of processing in parallel or at a necessary timing such as when a call is made.

Meanwhile, as used herein, a system is a collection of a plurality of constituent elements (devices, modules (components), or the like) and all the constituent elements may be located or not located in the same casing. Thus, a plurality of devices housed in separate housings and connected via a network, and one device in which a plurality of modules are housed in one housing are both systems.

The effects described herein are merely examples and are not limited, and other effects may be obtained.

The embodiments of the present technology are not limited to the aforementioned embodiments, and various changes can be made without departing from the gist of the present technology.

For example, the present technique may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of kinds of processing, the plurality of kinds of processing included in the one step can be executed by one device or executed in a shared manner by a plurality of devices.

<Combination Example of Configuration>

The present technology can also have the following configuration.

(1)

An information processing device including a display control unit that reflects a correction corresponding to a post-process for a shot image shot by a camera for shooting a display to display of a display image on the display based on at least one of a position of the camera, an attitude of the camera, and a shooting condition.

(2)

The information processing device according to (1), including a correction unit that makes a correction corresponding to the post-process to the display image based on at least one of the position of the camera, the attitude of the camera, and the shooting condition, wherein the display control unit causes the display to display the corrected display image.

(3)

The information processing device according to (2), wherein the post-process is processing for correcting degradation occurring on the display appearing in the shot image due to at least one of the position of the camera, the attitude of the camera, and the shooting condition.

(4)

The information processing device according to (3), wherein the camera shoots a subject with the display image displayed on the display as a background.

(5)

The information processing device according to (4), wherein the shooting condition includes settings of the camera, and the display control unit controls a position of the display image displayed on the display based on the position, attitude, and settings of the camera.

(6)

The information processing device according to (4) or (5), wherein the shooting condition includes settings of the camera, and the display control unit reflects a correction corresponding to the post-process to display of the display image on an area of the display included in a shooting range of the camera identified based on the position, attitude, and settings of the camera.

(7)

The information processing device according to any one of (3) to (6), wherein the shooting condition includes a lighting environment for shooting, and the post-process is processing for correcting a deviation in color balance of the display image caused by the lighting environment.

(8)

The information processing device according to (7), wherein the correction unit corrects the color balance of the display image by using a correction value acquired based on the shot image in which the display displaying a calibration pattern is shot in advance in the lighting environment.

(9)

The information processing device according to any one of (3) to (8), wherein the post-process is processing for correcting degradation caused by viewing angle characteristics of the display.

(10)

The information processing device according to (9), wherein the degradation caused by the viewing angle characteristics includes brightness degradation and color shift.

(11)

The information processing device according to any one of (3) to (10), wherein the post-process is processing for correcting at least one of brightness shading and color shading that occur on the display appearing in the shot image.

(12)

The information processing device according to any one of (3) to (11), wherein the post-process is processing for correcting distortion aberration occurring on the display appearing in the shot image.

(13)

The information processing device according to any one of (3) to (12), wherein the post-process is processing for correcting chromatic aberration of magnification occurring on the display appearing in the shot image.

(14)

The information processing device according to any one of (2) to (13), wherein the correction unit refers to a table, in which correction values for at least one of the position of the camera, the attitude of the camera, and the shooting condition are recorded, to acquire the correction value of the display image.

(15)

The information processing device according to (14), wherein the table is created based on the shot image in which the display displaying a calibration pattern is shot in advance while changing at least one of the position of the camera, the attitude of the camera, and the shooting condition.

(16)

The information processing device according to (14) or (15), wherein the correction value includes a vector for each pixel of the display.

(17)

The information processing device according to any one of (14) to (16), wherein the correction value includes a gain for each channel of each pixel of the display.

(18)

The information processing device according to any one of (1) to (17), wherein the display control unit reflects a correction corresponding to the post-process to display of the display image on the display based on an angle of the camera relative to each pixel of the display, the angle being identified based on the position and the attitude of the camera.

(19)

An information processing method including, by an information processing device, reflecting a correction corresponding to a post-process for a shot image shot by a camera for shooting a display to display of a display image on the display based on at least one of a position of the camera, an attitude of the camera, and a shooting condition.

(20)

A computer-readable recording medium that records a program for executing processing of reflecting a correction corresponding to a post-process for a shot image shot by a camera for shooting a display to display of a display image on the display based on at least one of a position of the camera, an attitude of the camera, and a shooting condition.

REFERENCE SIGNS LIST

1 Shooting system
11 Video camera
12 LED display
21 Information processing device
31 Shot image acquisition unit
32 Camera information acquisition unit
33 Shooting area calculation unit
34 Table creation unit
35 Table storage unit
36 Correction unit
37 Display control unit
38 Display image storage unit

The invention claimed is:

1. An information processing device comprising:
circuitry configured to
    control a correction corresponding to a post-process for a shot image shot by a camera for shooting a display that displays a display image on the display, and
    reflect the correction to the display image based on at least one of a position of the camera, an attitude of the camera, or a shooting condition,
wherein the post-process includes processing for correcting at least one of brightness degradation or a color shift.

2. The information processing device according to claim 1,
wherein the circuitry is further configured to control the display to display the corrected display image.

3. The information processing device according to claim 2,
wherein the post-process includes processing for correcting degradation occurring on the display appearing in the shot image due to the at least one of the position of the camera, the attitude of the camera, or the shooting condition.

4. The information processing device according to claim 3,
wherein the camera shoots a subject with the corrected display image displayed on the display as a background.

5. The information processing device according to claim 4,
wherein the shooting condition includes settings of the camera, and
wherein the circuitry is further configured to control a position of the corrected display image displayed on the display based on the position, the attitude, and settings of the camera.

6. The information processing device according to claim 4,
wherein the shooting condition includes settings of the camera, and
wherein the circuitry reflects the correction corresponding to the post-process to display of the display image on an area of the display included in a shooting range of the camera identified based on the position, the attitude, and settings of the camera.

7. The information processing device according to claim 3,
wherein the shooting condition includes a lighting environment for shooting, and wherein the post-process includes processing for correcting a deviation in color balance of the display image caused by the lighting environment.

8. The information processing device according to claim 7,
wherein the circuitry is further configured to correct the color balance of the display image by using a correction value acquired based on the shot image in which the display displaying a calibration pattern is shot in advance in the lighting environment.

9. The information processing device according to claim 3,
wherein the post-process includes processing for correcting degradation caused by viewing angle characteristics of the display.

10. The information processing device according to claim 9,
wherein the degradation caused by the viewing angle characteristics includes the at least one of the brightness degradation or the color shift.

11. The information processing device according to claim 3,
wherein the post-process includes processing for correcting at least one of brightness shading or color shading that occur on the display appearing in the shot image.

12. The information processing device according to claim 3,
wherein the post-process includes processing for correcting distortion aberration occurring on the display appearing in the shot image.

13. The information processing device according to claim 3,
wherein the post-process includes processing for correcting chromatic aberration of magnification occurring on the display appearing in the shot image.

14. The information processing device according to claim 2,
wherein the circuitry is further configured to refer to a table, in which correction values for the at least one of the position of the camera, the attitude of the camera, or the shooting condition are recorded, to acquire each correction value of the display image.

15. The information processing device according to claim 14,
wherein the table is created based on the shot image in which the display displaying a calibration pattern is shot in advance while changing the at least one of the position of the camera, the attitude of the camera, or the shooting condition.

16. The information processing device according to claim 14,
wherein each correction value includes a vector for each pixel of the display image.

17. The information processing device according to claim 14,
wherein each correction value includes a gain for each channel of each pixel of the display image.

18. The information processing device according to claim 1,
wherein the circuitry reflects the correction corresponding to the post-process to display of the display image on the display further based on an angle of the camera relative to each pixel of the display, the angle being identified based on the position and the attitude of the camera.

19. An information processing method, executed by an information processing device, controlling a correction corresponding to a post-process for a shot image shot by a camera for shooting a display that displays a display image on the display; and reflecting the correction to the display image based on at least one of a position of the camera, an attitude of the camera, or a shooting condition, wherein the post-process includes processing for correcting at least one of brightness degradation or a color shift.

20. A non-transitory computer-readable recording medium having embodied thereon a program, which when executed by a computer causes the computer to execute a method, the method comprising:

controlling a correction corresponding to a post-process for a shot image shot by a camera for shooting a display that displays a display image on the display; and reflecting the correction to the display image based on at least one of a position of the camera, an attitude of the camera, or a shooting condition, wherein the post-process includes processing for correcting at least one of brightness degradation or a color shift.

\* \* \* \* \*